(12) United States Patent
Nagare

(10) Patent No.: US 7,030,282 B2
(45) Date of Patent: Apr. 18, 2006

(54) STORAGE AND/OR TRANSPORTATION METHOD OF POLYALKYLENE GLYCOL MONOMERS

(75) Inventor: Koichiro Nagare, Yokohama (JP)

(73) Assignee: Nippon Shokubai Co., Ltd., Osaka (JP)

( * ) Notice: Subject to any disclaimer, the term of this patent is extended or adjusted under 35 U.S.C. 154(b) by 492 days.

(21) Appl. No.: 10/001,982

(22) Filed: Dec. 5, 2001

(65) Prior Publication Data

US 2002/0104462 A1    Aug. 8, 2002

(30) Foreign Application Priority Data

Dec. 6, 2000    (JP)    ............... 2000-371086

(51) Int. Cl.
   *C07C 43/15*    (2006.01)
(52) U.S. Cl. .................................. 568/616
(58) Field of Classification Search ............... 560/205, 560/224; 568/616
   See application file for complete search history.

(56) References Cited

U.S. PATENT DOCUMENTS

| | | | |
|---|---|---|---|
| 6,040,473 A | 3/2000 | Knebel et al. | |
| 6,166,112 A | 12/2000 | Hirata et al. | |
| 6,362,364 B1 | 3/2002 | Hirata et al. | |
| 6,716,896 B1 | 4/2004 | Hirata et al. | |

FOREIGN PATENT DOCUMENTS

| | | |
|---|---|---|
| EP | 0 850 895 A1 | 7/1998 |
| EP | 0 884 290 A2 | 12/1998 |
| EP | 0 989 109 A1 | 3/2000 |
| JP | 11-71151 | 3/1999 |
| JP | 2000-154049 | 6/2000 |
| JP | 2000-154049 A | 6/2000 |
| JP | 2000-154049 A1 | 6/2000 |
| JP | 2000-159881 A | 6/2000 |
| JP | 2000-159883 A | 6/2000 |
| JP | 2001-146447 A | 5/2001 |

OTHER PUBLICATIONS

Webster's II New Riverside University Dictionary, 1994, p. 304.*
Catalog of ALDRICH 1998-1999 (cover page, and pp. 1364-1365 and 1368-1369).
Bisomer E30W.
Bisomer P10W.
Bisomer S10W.
Bisomer S20W.

* cited by examiner

*Primary Examiner*—Rosalynd Keys
(74) *Attorney, Agent, or Firm*—Sughrue Mion, PLLC

(57) ABSTRACT

It is an object of the present invention to provide a storing and/or transferring method of polyalkylene glycol monomers by which the gel-like matter formation and/or decomposition reaction can be satisfactorily inhibited and, as a result, troubles can be prevented from occurring in the production process and the performance characteristics or quality of various chemical products can be satisfactorily prevented from being deteriorated.

A storing and/or transferring method of a polyalkylene glycol monomer which comprises storing and/or transferring a polyalkylene glycol monomer in the form of an aqueous solution.

8 Claims, No Drawings

US 7,030,282 B2

STORAGE AND/OR TRANSPORTATION METHOD OF POLYALKYLENE GLYCOL MONOMERS

TECHNICAL FIELD

The present invention relates to a storing and/or transferring method of polyalkylene glycol monomers and to a production method of cement additives using the above method.

BACKGROUND OF THE INVENTION

Polyalkylene glycol monomers, for example (meth) acrylic ester monomers obtainable by the esterification reaction of alkoxy (poly) alkylene glycols with an unsaturated monomer such as (meth)acrylic acid, and polyalkylene glycol monoalkenyl ether monomers such as unsaturated alcohol-alkylene oxide adducts, are of value as raw materials for the production of various polymers. Such polymers can suitably be used, for example, as cement additives (cement dispersants), pigment dispersants for dispersing calcium carbonate, carbon black, ink and the like, scaling inhibitors, dispersants for gypsum-water slurries, dispersants for coal-water slurries (CWM), thickening agents and like chemical products.

After the production of polyalkylene glycol monomers, they are generally stored and transferred before they are used as raw materials for polymer production. For example, they are stored for a while or for a fairly long time before use in polymer production or, when the plant for polyalkylene glycol monomer production is remote from the plant for polymer production, they are to be transferred. Thereafter, the polymerization step is carried out by adding the polyalkylene glycol monomer sequentially, to a polymerization reaction vessel.

When, however, a polyalkylene glycol monomer, which is generally used as a raw material for polymer production, occurs as a solid at ordinary temperature, it is melted by heating in using the same after storage and/or transfer. On that occasion, a gel-like matter is formed or, in the case of a (meth)acrylic ester monomer, it tends to be hydrolyzed or in the case of a polyalkylene glycol monoalkenyl ether monomer, it tends to be thermally decomposed. Furthermore, when a polyalkylene glycol monomer is stored and/or transferred in a heated and molten state, it may be oxidized, resulting, with high probability, in an increased peroxide value (POV) and gel-like matter formation in using the same. The reaction formula explaining the thermal decomposition of an unsaturated alcohol-alkylene oxide adduct and the reaction formula explaining the hydrolysis of a (meth)acrylic ester monomer are shown below by way of example as formulas (1) and (2):

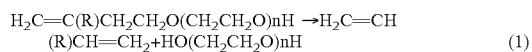

(1)

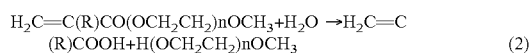

(2)

R: a hydrogen atom or a methyl group.

Such troubles occurring during storage and/or transfer of a polyalkylene glycol monomer result in a decreased purity or decreased quality because of increased impurity content in polymer production, hence a deterioration in quality or performance characteristics of the chemical product produced from such polymer. For example, in the case of a cement dispersant, it has effects to improve the flowability of a cement composition and, at the same time, to improve the strength and durability of hardened products. When, however, it is contaminated with impurities or the polymer is deteriorated in its performance characteristics or quality, the resulting hardened products, such as civil engineering or building structures, may show a lowered strength or durability, whereby such problems as decreased safety and/or increases in repairing cost may possibly be caused.

It is an object of the present invention, which has been made in view of the above-mentioned state of the art, to provide a storing and/or transferring method of a polyalkylene glycol monomer by which the gel-like matter formation and/or decomposition reaction can be satisfactorily inhibited and, as a result, troubles can be prevented from occurring in the production process and the performance characteristics or quality of various chemical products can be satisfactorily prevented from being deteriorated.

SUMMARY OF THE INVENTION

The present invention provides a storing and/or transferring method of a polyalkylene glycol monomer which comprises storing and/or transferring a polyalkylene glycol monomer in the form of an aqueous solution.

The present inventors made intensive investigations in an attempt to efficiently produce various polymers, such as high-quality polymers for cement additives and, as a result, noticed that polyalkylene glycol monomers, which are to be used as raw materials in the production of polymers for cement additives and so forth and generally occur as solids, when stored or transferred as such and heated for melting on the occasion of use thereof, (1) undergo polymerization upon heating, leading to gel-like matter formation, (2) undergo hydrolysis and/or thermal decomposition, leading to quality deterioration and (3) undergo promoted oxidation, leading to increased peroxide values (POVs) and then found that, for avoiding such troubles, contrivances are to be made to prevent those monomers from being heated during storage, transfer and use thereof. Specifically, they searched for a method of storing and/or transferring polyalkylene glycol monomers and found that when polyalkylene glycol monomers are stored and/or transferred in the form of an aqueous solution, the above problems can be successfully solved, and they have now completed the present invention. They also found that since polymers obtained by using, as raw materials for the production thereof, those polyalkylene glycol monomers stored and/or transferred by such method show high quality, these polymers can suitably be used as polymers for cement additives.

DETAILED DESCRIPTION OF THE INVENTION

In the following, the present invention is described in detail.

According to the storing and/or transferring method of a polyalkylene glycol monomer in the present invention, a polyalkylene glycol monomer is stored and/or transferred in the form of an aqueous solution.

The above polyalkylene glycol monomer means a polyalkylene glycol chain-containing unsaturated monomer or a mixture containing the same. As the polyalkylene glycol chain-containing unsaturated monomer, there may be mentioned, for example, one or two or more of among polyalkylene glycol chain-containing (meth)acrylic ester monomers, polyalkylene glycol monoalkenyl ether monomers such as unsaturated alcohol-alkylene oxide adducts and polyalkylene glycol- and unsaturated alcohol-derived etherification products, unsaturated amine-alkylene oxide adducts, unsaturated amine- and carboxyl group-containing polyalkylene glycol-derived amidation products, and the like. From the viewpoint of preventing troubles arising upon melting by heating, the method of the invention is suitably applied to those polyalkylene glycol monomers occurring as solids at ordinary temperature (20° C.). In cases where a polyalkylene glycol monomer is used as a raw material for production of polymers for cement additives, it preferably comprises, as an essential constituent, a polyalkylene glycol chain-containing (meth)acrylic ester monomer or a polyalkylene glycol monoalkenyl ether monomer.

In the storing and/or transferring method according to the invention, "storing" or "storage" means a procedure comprising placing and storing a substance in a storage vessel for a while or continuously for a long period of time and "transferring" or "transfer" means, among procedures involving transfer of a substance, a procedure comprising moving a substance from one place to another using a container, drum, oil can or plastic tank or a like transfer vessel and is also known as "transportation". The storage vessel and the transfer vessel respectively include not only containers and drums but also tanks on the ground, underground tanks and the like in the case of storage vessels. The material of construction of such vessels is preferably one capable of maintaining a tightly closed state during storage and/or transfer and hardly undergoing decomposition or degeneration in the temperature range of −50° C. to 150° C. Suited for use are, for example, stainless steel species (SUS), aluminum and iron. In the practice of the present invention, the vessels may be used for both storage and transfer of the polyalkylene glycol monomers or for either storage or transfer alone.

In the practice of the present invention, a polyalkylene glycol monomer can be given an aqueous solution form, for example, by mixing the polyalkylene glycol monomer with water or by causing the polyalkylene glycol monomer to contain water on the occasion of synthesizing the same. The polyalkylene glycol monomer prior to being made into an aqueous solution may be a solid or in a liquid form dissolved in a solvent other than water.

Referring to the aqueous polyalkylene glycol monomer solution, the concentration of water in the aqueous solution is preferably not more than 90% by weight, more preferably 1 to 90% by weight, still more preferably 10 to 50% by weight, with the whole amount of the aqueous solution being taken as 100% by weight. If it exceeds 90% by weight, the polyalkylene glycol monomer is to be stored and/or transferred together with the overwhelming majority of water in storing and/or transferring the monomer and this is uneconomical. If the concentration of water is less than 1%, the polyalkylene glycol monomer may possibly be in a solid state. In such a case, the polyalkylene glycol monomer will have to be melted by heating prior to use thereof and, on such occasion, the polyalkylene glycol monomer may possibly undergo polymerization, hydrolysis and thermal decomposition, and the POV may increase. As mentioned later herein, the water concentration can appropriately be selected according to the polyalkylene glycol monomer species to be used.

The temperature of the above aqueous solution is preferably not lower than the pour point of said aqueous solution and within a range such that troubles resulting from polymerization, hydrolysis and/or thermal decomposition of the polyalkylene glycol monomer and/or from increases in POV can be suppressed and, accordingly, the occurrence of troubles in the production process and the deterioration in performance characteristics and quality of various chemical products can be prevented to a satisfactory extent. When a temperature not lower than the pour point of the aqueous solution is selected, it is not necessary to melt the polyalkylene glycol monomer by heating in using the same and it becomes possible to effectively prevent troubles with the polyalkylene glycol monomer from occurring. On that occasion, it is preferable to adjust the concentration of water in the aqueous solution so that the solution may flow at ordinary temperature (20° C.). By doing so, it is possible to manifest the effects of the invention more assuredly. If the aqueous solution does not flow at ordinary temperature, it is preferably heated to a temperature not higher than 110° C., more preferably not higher than 100° C. Even when it is heated in that manner, no local overheating will occur because the specific heat of water and the convection in the aqueous solution occur and troubles with the polyalkylene glycol monomer can be prevented from occurring. A range of 30 to 90° C. is more preferred and a range of 45 to 65° C. is still more preferred.

In the practice of the present invention, the polyalkylene glycol monomer preferably comprises a monomer represented by the following general formula (1):

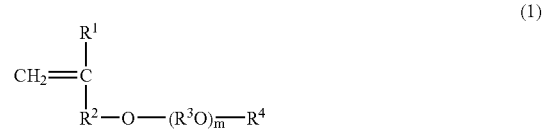

(1)

It is preferred that such a monomer be contained as the main constituent in the polyalkylene glycol monomer. In this case, the polyalkylene glycol monomer may additionally contain other component(s) or be free of any other component. In both cases, the polyalkylene glycol monomer of the present invention can suitably be used as a raw material for the production of polymers for cement additives. The monomer represented by the above general formula (1) is one of configurations of polyalkylene glycol chain-containing (meth)acrylic ester monomers or unsaturated alcohol-alkylene oxide adducts. As the polyalkylene glycol monomer represented by the above general formula (1), there may be mentioned, for example, "polyalkylene glycol- and (meth)acrylic acid-derived esterification products", which are (meth)acrylic ester monomers, and "unsaturated alcohol-alkylene oxide adducts", which are polyalkylene glycol monoalkenyl ether monomers.

In the above general formula (1), $R^1$ and $R^4$ are the same or different and each represents a hydrogen atom or a hydrocarbon group containing 1 to 30 carbon atoms. $R^2$ represents —CO—, —CH$_2$—, —(CH$_2$)$_2$— or —C(CH$_3$)$_2$—, $R^3$O are the same or different and each represents an oxyalkylene group containing 2 to 18 carbon atoms, preferably 2 to 8 carbon atoms, and m represents the average number of moles of the oxyalkylene group represented by $R^3$O as added and is a number of 15 to 300. The "average number of moles added" means the average value of the number of moles of the repeating unit in question in each mole of the compound in question.

If number of carbon atoms in the above $R^1$ and/or $R^4$ exceeds 30 and/or the number of carbon atoms in the above $R^3$O exceeds 18, the water solubility of the polymers obtainable by using the polyalkylene glycol monomer as a raw material for the production will be decreased and, when such polymers are used as cement additives and the like, the performance characteristics for such use, namely the cement dispersing ability and so on, may possibly be deteriorated. If the above m is less than 15, the performance characteristics of the polymers in using as cement additives or the like may possibly be deteriorated and, in addition, the polyalkylene glycol monomer may occur as a liquid and the effects of the present invention will not be fully manifested accordingly. If it exceeds 300, it will possibly be difficult to prepare polyalkylene glycol monomers.

As for the number of carbon atoms in the above group $R^1$, $R^4$ or $R^3O$, a preferred range is to be selected according to the intended use of the polyalkylene glycol monomer. For example, when the monomer is to be used as a raw material for the production of polymers for cement additives, $R^1$ is preferably a hydrogen atom or a methyl group. As for $R^4$, it may be, for example, an alkyl group such as methyl, ethyl, n-propyl, isopropyl, n-butyl, tert-butyl, pentyl, hexyl, octyl, nonyl, 2-ethylhexyl, decyl, dodecyl, undecyl, tridecyl, tetradecyl, pentadecyl, hexadecyl, heptadecyl, octadecyl, nonadecyl, eicosyl, heneicosyl or docosyl group; an aryl group such as phenyl group; an alkylphenyl group such as benzyl or nonylphenyl group; a cycloalkyl group such as cyclohexyl group; an alkenyl group such as vinyl, allyl, 3-butenyl or 3-methyl-3-butenyl; or an alkynyl group. Among these, straight or branched chain alkyl groups of 1 to 18 carbon atoms and aryl groups are preferred, and methyl, ethyl, propyl, butyl and phenyl groups are more preferred.

As the above group $R^3O$, there may be mentioned, for example, oxyethylene, oxypropylene, oxybutylene and oxystyrene groups and, among these, oxyethylene, oxypropylene and oxybutylene groups are preferred. $R^3O$ is the repeating unit constituting the monomer represented by the general formula (1) and the respective repeating units may be the same or different. In cases where the compound has two or more different kinds of the repeating units, the mode of addition of the respective repeating units is not particularly restricted but may be blockwise or random.

The range of the above-mentioned number m is to be selected according to the intended use of the polyalkylene glycol monomer. When the monomer is used as a raw material for the production of polymers for cement additives, for instance, m is preferably 15 to 300, more preferably 20 to 200, still more preferably 25 to 150. For use as thickening agents, m is preferably 15 to 250, more preferably 50 to 200.

When the above number m is 0, the above $R^4$ is preferably a hydrocarbon group containing not less than 4 carbon atoms from the viewpoint of water solubility and/or boiling point. Thus, when m is 0, the alcohol, in particular methanol or ethanol, which is to be subjected to esterification reaction under dehydration with such an unsaturated monomer as (meth)acrylic acid to give the polyalkylene glycol monomer, has a low boiling point, so that it evaporates together with byproduct water and is dissolved in the byproduct water. Thus, some of said raw material alcohol is distilled off out of the reaction system, causing a decrease in the yield of the desired polyalkylene glycol monomer. This needs to be prevented.

Referring to the monomer represented by the above general formula (1), the pour point of the aqueous solution of the polyalkylene glycol monomer becomes higher as the number m increases. Thus, for the aqueous solution of the polyalkylene glycol monomer to be able to flow at ordinary temperature, the concentration of water in the aqueous solution is to be increased as the number m increases. For example, if the number m is 25, as shown in Table 1 as an example, a liquid will be obtained when the monomer concentration is 80% by weight (the concentration of water being 20% by weight) whereas the monomer will occur as a solid when the monomer concentration is 100% by weight (the concentration of water being 0% by weight). If m is 120, a liquid will be obtained when the monomer concentration is 60% by weight (the concentration of water being 40% by weight) and, when the monomer concentration is 80% by weight (the concentration of water being 20% by weight), a solid will be obtained.

TABLE 1

| m | Monomer concentration at which a liquid is obtained at ordinary temperature | Monomer concentration at which solidification occurs at ordinary temperature |
|---|---|---|
| 25 moles | 80% | 100% |
| 120 moles | 60% | 80% |

In the above general formula (1), $R^2$ is preferably —CO—, —CH$_2$— or —(CH$_2$)$_2$— and, when $R^1$ is a hydrogen atom, $R^2$ is preferably —CO— or —(CH$_2$)$_2$— and, when $R^1$ is a hydrocarbon group containing 1 to 3 carbon atoms, $R^2$ is preferably —CO— or —CH$_2$—.

In accordance with the present invention, the above polyalkylene glycol monomer is preferably used as a raw material for a production of polymers for cement additives. Thus, the polymers obtainable from the polyalkylene glycol monomer of the present invention are preferably used as raw materials in the production of cement additives. In this way, it becomes possible to produce cement additives stably while preventing them from being deteriorated in performance characteristics or quality.

In the practice of the present invention, the POV of the above polyalkylene glycol monomer is preferably at a level not higher than 2, more preferably not higher than 1, still more preferably not higher than 0.7, during and after the above-mentioned storage and/or transfer. Thereby, it becomes possible to prevent the gel-like matter formation with more certainty. The POV can suitably be measured by the following method, for instance.

Method of Determining the Peroxide Value (POV)

About 10 g of the polyalkylene glycol monomer is accurately weighed in an erlenmeyer flask equipped with a stopcock, and 50 ml of a solvent (mixture composed of 500 ml of isopropyl alcohol, 100 ml of water and 150 ml of acetic acid) is added to dissolve the sample. After dissolution of the sample, while purging the flask inside with nitrogen gas, 1 ml of saturated potassium iodide is added and the mixture is stirred for 1 minute and, then, allowed to stand in the dark for 30 minutes. To the thus-prepared yellow and transparent test solution is added dropwise 0.01 N sodium thiosulfate until the brown color of the test solution is disappeared. The amount (ml) of the titrant sodium thiosulfate is determined and the peroxide value is calculated using the formula given below. The blank value (ml) is determined by the same procedure as mentioned above except that a test solution prepared without adding the polyalkylene glycol monomer is used in lieu of the above test solution.

Peroxide Value (milliequivalents/g)=[(S−B)×10]/I
S: Amount (ml) of the titrant sodium thiosulfate obtainable by using the sample to be assayed
B: Blank value (ml)
I: Amount (g) of the sample charged Referring to the above general formula (1), when, for example, $R^1$ is a hydrogen atom or a methyl group and $R^2$ is —CO—, the general formula (1) represents a (meth) acrylic ester monomer. For producing such a (meth)acrylic ester monomer, the production method which comprises carrying out the esterification reaction step and, if necessary, followed by a neutralization step and a step of distilling off the solvent can be employed.

In the above esterification step, a reaction solution containing an alkoxy(poly)alkylene glycol and (meth)acrylic acid is subjected to esterification reaction, whereby the monomer represented by the general formula (1) can be produced in a simple and easy manner from the industrial viewpoint. The compound used as starting reactants in such a step may each comprise one single species or a combination of two or more species. The monomer formed in such an esterification reaction step is also referred to as an ester, esterification product or dehydration reaction product.

In the above esterification step, the esterification reaction reaches a state of chemical equilibrium and, therefore, the reaction proceeds upon removal of the byproduct water formed by the reaction from the reaction vessel. In such a step, the following procedures are carried out: (1) the procedure for admixing a dehydrating solvent with the reaction solution, if necessary, and causing a distillate to be formed by azeotropic evaporation of said dehydrating solvent and water so that the byproduct water formed in the reaction vessel can be removed with ease, (2) the procedure for causing the distillate to pass through a connecting pipe joining the reaction vessel with a condenser and to enter the condenser for condensation and liquefaction of the distillate in said condenser, (3) the procedure for separating the condensed and liquefied distillate into the dehydrating solvent and water in a water separator connected with the condenser and (4) the procedure for refluxing the dehydrating solvent separated into the reaction vessel. In such steps, the above procedures are carried out by using, for example, an esterification reaction apparatus comprising, as essential constituents thereof, the reaction vessel, the condenser and the connecting pipe joining said reaction vessel with said condenser and the water separator connected with said condenser via a feeding pipe.

The above reaction vessel has the same meaning as the reactor, reaction chamber, reaction kettle, etc. and includes all vessels where an esterification reaction can be carried out, without any particular limitation. The shape of the reaction vessel is not particularly restricted but may be polygonal pillar-like, cylindrical, or the like. In view of the agitating efficiency, handleability and versatility, the cylindrical type is preferred, however. It may have or not have a baffle plate. The system of heating of the reaction vessel may be one in which heating is carried out by contacting a heating medium, such as steam, with an external jacket or one in which heating is carried out by means of a heating apparatus, such as a coil, disposed within the reaction vessel. The material of construction of the inside of such reaction vessel is not particularly restricted but may be any of such known materials as SUS species and the like. Preferred from the viewpoint of corrosion resistance are SUS 304, SUS 316, SUS 316L. More preferred are SUS 316, SUS 316L and the like. The inside wall of the reaction vessel may be processed, for example by glass lining, so that it may be rendered inert to the starting reactants and products. Generally, such reaction vessel is equipped with a stirrer so that the esterification reaction can be carried out homogeneously and efficiently. The stirrer is not particularly restricted. The stirrer generally comprises an electric motor, a shaft and a stirring blade(s).

The stirring blades may be optional in shape. As the stirring blades, there may be mentioned desk turbines, fan turbines, curved fan turbines, herringbone turbines, multistage fan turbine blades, Pfaudler type impellers, Brumagin type, angled blades, propeller type, multiple blades, anchor type, gate type, double ribbon blades, screw blades, max blend blades and so forth. Among them, multistage fan turbine blades and Pfaudler type impellers are preferred because of their versatility.

The above-mentioned condenser is an apparatus for condensing and liquefying the distillate coming from the reaction vessel, and the above condensation/liquefaction is effected by heat exchange between the distillate and an extratubular fluid, namely, a cooling fluid. The "distillate" means all the matter distilled off from the reaction vessel by the esterification reaction step and other steps. Thus, it includes byproduct water distilled off from the reaction vessel, the dehydrating solvent used for azeotropic distillation with byproduct water according to need and such starting reactants as (meth)acrylic acid distilled off and so on. As the form thereof, a gas and/or liquid can be mentioned.

The material of construction of the above condenser may be any of such known ones as SUS species, for example SUS 304, SUS 316 and SUS 316L, and carbon steel (CS) species. For further reducing the gel-like matter formation, the condenser inside may preferably be mirror-finished or glass-lined. In view of the cost required for such processing or maintenance, however, the condenser made of SUS species such as SUS 304, SUS 316 or SUS 316L is preferably used, more preferably SUS 316 or SUS 316L.

The heat transfer area of the above condenser may vary according to the capacity of the reaction vessel and other factors but is preferably 50 to 500 m$^2$, more preferably 100 to 200 m$^2$, for a reaction vessel of 30 m$^3$, for instance. The cooling medium to be used in such condenser is, for example, water or an oil.

The capacity of the above water separator may vary according to the capacity of the reaction vessel, the amount of the distillate and other factors but is preferably 1 to 20 m$^3$, more preferably 3 to 10 m$^3$, for a reaction vessel of 30 m$^3$, for instance.

The polyalkylene glycol to be used in the above esterification reaction comprises a compound represented by the general formula (2) given below. Such compound is preferably contained as the main constituent in the polyalkylene glycol. In this case, the polyalkylene glycol may additionally contain or be free of any other components.

$$R^6(R^3O)_mH \qquad (2)$$

In the formula (2), $R^3O$ and m are defined above referring to the general formula (1). $R^6$ is the same as the above-mentioned $R^4$.

As for the number of carbon atoms in the above $R^6$, a preferred range is to be selected according to the intended use of the polyalkylene glycol monomer. For example, when the monomer is to be used as a raw material for the production of polymers for cement additives, $R^6$ is, for example, an alkyl group such as methyl, ethyl, n-propyl, isopropyl, n-butyl, tert-butyl, pentyl, hexyl, octyl, nonyl, 2-ethylhexyl, decyl, dodecyl, undecyl, tridecyl, tetradecyl, pentadecyl, hexadecyl, heptadecyl, octadecyl, nonadecyl, eicosyl, heneicosyl or docosyl group; an aryl group such as phenyl group; an alkylphenyl group such as benzyl or nonylphenyl group; or a cycloalkyl group such as cyclohexyl group. Among these, straight or branched chain alkyl groups of 1 to 18 carbon atoms and aryl groups are preferred, and methyl, ethyl, propyl, butyl and phenyl groups are more preferred.

In the above esterification reaction, a carboxyl group-containing unsaturated monomer can be used together with (meth)acrylic acid. The carboxyl group-containing unsaturated monomer is a monomer having at least a carboxyl group and an unsaturated bond and specifically includes unsaturated monocarboxylic acids such as crotonic acid, tiglic acid, citronellic acid, undecylenic acid, elaidic acid, erucic acid, sorbic acid, linolic acid and the like; unsaturated dicarboxylic acids such as maleic acid, fumaric acid, citraconic acid, mesaconic acid, itaconic acid and the like. These may be used singly or two or more of them may be used in combination.

The above esterification reaction may be carried out, if necessary, in the presence of a catalyst added to the reaction system. Preferably, the reaction is carried out in the presence of a catalyst. An acid catalyst is particularly suited for use in the esterification reaction and can cause the reaction to proceed swiftly. Such an acid catalyst may also be used in the form of a hydrate and/or an aqueous solution and includes, for example, sulfuric acid, methanesulfonic acid, paratoluenesulfonic acid, paratoluenesulfonic acid hydrate, xylenesulfonic acid, xylenesulfonic acid hydrate, naphthalenesulfonic acid, naphthalenesulfonic acid hydrate, trifluoromethanesulfonic acid, "Nafion (trademark)" resin (product of Du Pont), "Amberlyst 15 (trademark)" resin, phosphotungstic acid, phosphotungstic acid hydrate and hydrochloric acid. These may be used singly or two or more of them may be used in combination.

Among the acid catalysts mentioned above, from the viewpoint of the azeotropic temperature with water and the dehydrating solvent to be mentioned later herein or of the reaction temperature, those having a high boiling point at ordinary pressure (1,013 hPa), more specifically a boiling point at ordinary pressure of not lower than 150° C. are preferred, more preferably not lower than 200° C. As such acid catalysts, there may be mentioned, for example, sulfuric acid (boiling point at ordinary pressure: 317V), paratoluenesulfonic acid (boiling point: 185 to 187° C./13.3 Pa (0.1 mmHg)), paratoluenesulfonic acid hydrate and methanesulfonic acid (boiling point: 167° C./1,333.2 Pa (10 mmHg)). Among them, the use of paratoluenesulfonic acid or paratoluenesulfonic acid hydrate is suitable.

The level of addition of the above acid catalyst is not particularly restricted but may be selected within a range in which the desired catalytic activity can effectively be manifested. A level not more than 0.4 milliequivalent/g, for instance, is preferred. If the addition level exceeds 0.4 milliequivalent/g, the amount of the diester formed in the reaction system by the esterification reaction increases and when such esterification product is used in synthesizing polymers for use as cement additives, the products may show a decreased level of cement dispersing ability. The addition level is more preferably 0.36 to 0.01 milliequivalent/g, still more preferably 0.32 to 0.05 milliequivalent/g. The level of addition of the acid catalyst (milliequivalents/g) is expressed by the value obtainable by dividing the number of equivalents (milliequivalents) of $H^+$ of the acid catalyst used for the reaction by the total amount (g) of the starting reactants charged, more specifically the value calculated by the formula given below. The above acid catalyst may be added to the reaction system all at once or continuously or in portions. In view of the workability, it is preferably charged into the reaction vessel all at once together with the starting reactants.

Acid Catalyst Addition Level (milliequivalents/g)=L/(M+N)

L: Number of equivalents (milliequivalents) of $H^+$ of the acid catalyst

M: Weight (g) of the alcohol charged

N: Weight (g) of (meth)acrylic acid charged

The above esterification reaction is preferably carried out in the presence of a polymerization inhibitor. By doing so, the unsaturated carboxylic acid in the starting reactants and the product thereof, namely the monomer represented by the general formula (1), can be inhibited from being polymerized. Those polymerization inhibitors which are known in the art can be used as such polymerization inhibitor, without any particular limitation. For example, there may be mentioned phenothiazine, tri(p-nitrophenyl)methyl, di(p-fluorophenyl)amine, diphenylpicrylhydrazyl, N-(3-N-oxyanilino-1,3-dimethylbutylidene)aniline oxide, benzoquinone, hydroquinone, methoquinone, butylcatechol, nitrosobenzene, picric acid, dithiobenzoyl disulfide, cupferron, copper (II) chloride, etc. These may be used singly or two or more of them may be used in combination. Among these, phenothiazine, hydroquinone and methoquinone are preferably used in view of their solubility. These can show their polymerization inhibiting ability very effectively in the esterification reaction step as well in the step of distilling off the solvent, hence are very useful.

The level of addition of the above polymerization inhibitor is preferably 0.001 to 1% by weight with the total amount of the starting reactants, namely the alcohol (i.e. polyalkylene glycol) and the acid, being taken as 100% by weight. If it is less than 0.001% by weight, the polymerization inhibiting effect will be produced only to an unsatisfactory extent, hence it will become difficult to effectively inhibit the starting reactant and/or product from being polymerized. If it exceeds 1% by weight, the amount of the polymerization inhibitor remaining in the polyalkylene glycol monomer increases, which may possibly deteriorate the quality and performance characteristics. Further, the excessive portion added will not produce any extra effect, which may be disadvantageous from the economical viewpoint. A level of 0.001 to 0.1% by weight is more preferred.

The above esterification reaction procedure may be carried out without using any dehydrating solvent but is preferably carried out using a dehydration solvent while, for example, distilling byproduct water off out of the reaction system azeotropically together with the dehydrating solvent, condensing and liquefying the azeotrope, separating and removing byproduct water and refluxing the dehydrating solvent. By doing so, byproduct water formed by the esterification reaction can be efficiently removed azeotropically. Such dehydrating solvent is not particularly restricted but may be any solvent capable of forming an azeotrope with water. Thus, it includes, for example, benzene, toluene, xylene, cyclohexane, dioxane, pentane, hexane, heptane, chlorobenzene and isopropyl ether. These may be used singly or two or more of them may be used in combination. Among these, those having an azeotropic temperature with water of not higher than 150° C. are preferred and those having an azeotropic temperature of 60 to 90° C. are more preferred. As such dehydrating solvents, there may specifically be mentioned cyclohexane, toluene, dioxane, benzene, isopropyl ether, hexane, heptane and the like. When the azeotropic temperature with water exceeds 150° C., the workability, inclusive of the controllability of the temperature in the reaction system during reaction and the controllability in the condensation/liquefaction treatment of the distillate, may possibly become poor.

In the esterification reaction procedure using the above dehydrating solvent, the dehydrating solvent is used preferably in an amount of 0 to 100% by weight with the total charged amount of the starting reactants, namely the alcohol (i.e. polyalkylene glycol represented by the general formula (2)) and the acid, being taken as 100% by weight. When the amount exceeds 100% by weight, the addition in excess will not produce any extra effect and, in addition, an increased amount of heat is required to maintain the reaction temperature at a constant level, which may possibly be disadvantageous in an economical viewpoint. An amount of 2 to 50% by weight is more preferred.

In the above esterification reaction step, the esterification reaction can be carried out by any of the batchwise and continuous reaction procedures. The batchwise procedure is preferred, however. The reaction conditions are not particularly restricted but may be those conditions under which the reaction can proceed smoothly. For example, the reaction temperature is preferably 30 to 180° C., more preferably 60 to 130° C., still more preferably 90 to 125° C., most preferably 100 to 120° C. If it is lower than 30° C., the refluxing of the dehydrating solvent will be slow and a longer time will be required for dehydration and, in addition, the reaction may not proceed smoothly. If it is higher than 180° C., some of the starting reactants may decompose, hence the polymers obtainable from the polyalkylene glycol monomer may be deteriorated in dispersing and thickening characteristics in various uses, for example cement dispersing ability, polymerization of the starting reactants or contamination of the distillate with the starting reactants may increase or the polyalkylene glycol monomer may possibly be deteriorated in performance characteristics or quality.

Under the above reaction conditions, the reaction time is preferably such that the conversion in the esterification reaction of not lower than 70% is attained, as mentioned later herein, more preferably not lower than 80%, still more preferably not lower than 98%. Normally, it is 1 to 100 hours, preferably 3 to 60 hours. As for the reaction pressure, the reaction may be carried out at ordinary pressure or under reduced pressure. From the equipment viewpoint, the reaction is preferably carried out at ordinary pressure, however.

Preferably, the above esterification reaction is carried out until a conversion of not lower than 70% is attained. If the it is less than 70%, the yield of the product ester will be unsatisfactory and, in addition, the polymers for cement additives obtainable by using such product as a starting material for polymerization may possibly be deteriorated in performance characteristics required for the intended uses, namely the cement dispersing ability and soon. More preferably, it is 70 to 99%, still more preferably 80 to 98%. The above conversion is the ratio between the amount of the starting reactant alcohol as charged and the amount thereof at the time of completion of the reaction and is, for example, the value (%) calculated using the formula given below, following determination of respective peak areas by liquid chromatography (LC) under the conditions shown below:

Esterification Percentage (conversion %)=[(S−T)/S]×100

S: Area measured for the alcohol charged

T: Area measured for the alcohol after completion of the esterification

Conversion Measuring Conditions

Analyzing apparatus: Waters Millennium Chromatography Manager (trademark)

Detector: Waters 410 RI detector (trademark)

Columns to be used: GL Science Inertsil ODS-2 (inside diameter 4.6 mm, length 250 mm) (trademark), three columns Column temperature: 40° C.

Eluent: A solution prepared by mixing 8,946 g of water, 6,000 g of acetonitrile and 54 g of acetic acid and adjusting the pH to 4.0 with a 30% aqueous solution of sodium hydroxide.

Flow rate: 0.6 ml/min.

When an acid catalyst is used in the above esterification reaction step, it is preferable to carry out a neutralization step for neutralizing the acid catalyst and (meth)acrylic acid. By doing so, the catalyst loses its activity and the monomer represented by the general formula (1) obtainable by the esterification reaction can be prevented from being hydrolyzed and the formation of impurities not to be involved in polymerization can be suppressed and, as a result, the polymers can be suppressed from being deteriorated in quality or performance characteristics. When a dehydrating solvent is used, it is preferable to carry out a step of removing the solvent by distillation for distilling off the dehydrating solvent.

The above neutralization step is preferably carried out, for example, by neutralizing the acid catalyst with a neutralizing agent after completion of the esterification reaction.

The above neutralizing agent is not particularly restricted but maybe any agent capable of neutralizing the acid catalyst. Thus, there may be mentioned, for example, alkali metal or alkaline earth metal hydroxides such as sodium hydroxide, potassium hydroxide, calcium hydroxide and lithium hydroxide; alkali metal or alkaline earth metal carbonates such as sodium carbonate, calcium carbonate and lithium carbonate; ammonia and amines such as monoethanolamine, diethanolamine and triethanolamine. These may be used singly or in combination of two or more. The form of the neutralizing agent is not particularly restricted, and, for example, the form of an alkaline aqueous solution is preferred.

In the above neutralization step, the acid catalyst and (meth)acrylic acid are neutralized and it is preferred that the amount of the neutralizing agent be selected so that the whole amount of the acid catalyst and some of (meth)acrylic acid can beneutralized. In this case, the portion of (meth) acrylic acid to be neutralized is preferably not more than 20% by weight, more preferably 0.01 to 5% by weight with the amount of (meth)acrylic acid remaining after the esterification reaction being taken as 100% by weight. Among the acid catalyst and (meth)acrylic acid, the acid catalyst is higher in acid strength, hence the acid catalyst is first neutralized.

As regards the method of neutralization in the above neutralization step, when the esterification reaction is carried out in a dehydrating solvent, it is preferable to add water to the reaction system together with the alkali. This is because, in the absence of water, the alkali, which is hardly soluble in the dehydrating solvent, floats in a concentrated state in the reaction system and such floating of the high concentration alkali continues for a long period until the alkali has been consumed for neutralization, thus causing hydrolysis of the (meth)acrylic ester monomer. In this case, the amount of addition of water may vary according to the application form of the alkali but, when a 40 to 60% by weight of an alkaline aqueous solution is used as the neutralizing agent, for example, water is preferably added, in addition to the alkaline aqueous solution, generally in an amount of 5 to 1,000 parts by weight, more preferably 10 to 100 parts by weight, per part by weight of the alkaline aqueous solution.

If the amount of water is less than 5 parts by weight, the alkali may be unhomogeneous in the reaction system. If it exceeds 1,000 parts by weight, a separate neutralization vessel may be required to secure the productivity, leading to an increase in production cost.

The neutralization temperature in the above neutralization step is preferably not higher than 90° C., for instance, more preferably 0 to 80° C., still more preferably 25 to 65° C. At temperatures higher than 90° C., the neutralizing agent added may act as a hydrolyzing catalyst, possibly causing hydrolyzate formation in large amounts. At not higher than 80° C., such hydrolyzates formation is sufficiently inhibited whereas, at lower than 0° C., the reaction mixture becomes viscous and the stirring becomes difficult accordingly and, in addition, a long period of time is required for increasing the temperature to a predetermined level for the removal of water by distillation after the reaction and/or it becomes necessary to provide a new cooling means (apparatus) for lowering the temperature below room temperature, whereby the production cost may possibly be increased.

The method of distilling off the dehydrating solvent in the above-mentioned solvent removing step is not particularly restricted. For example, the dehydrating solvent alone may be distilled off, or the solvent may be distilled off with an appropriate additive added. It is preferable, however, to use water and distill off the dehydrating solvent azeotropically. In this case, no substantial amount of the acid catalyst or alkali remains in the reaction system owing to the neutralization step being carried out, so that even when water is added and the temperature is raised, no hydrolysis reaction takes place. By using such a method, the dehydrating solvent can be removed at lower temperatures.

The conditions for the above method of distilling off are not particularly restricted provided that the dehydrating solvent in the reaction system can appropriately be distilled off (evaporated). Generally, when water is used, the liquid temperature (at ordinary pressure) in the reaction vessel during distilling off the solvent, for instance, is preferably 80 to 120° C., more preferably 90 to 110° C. When water is not used, a temperature of 80 to 160° C. is generally preferred and a temperature of 90 to 150° C. is more preferred. In both of the above cases, a lower temperature than the above-specified range may fail to be a sufficient temperature (sufficient quantity of heat) to evaporate the dehydrating solvent while, at a higher temperature than the above range, polymerization may be caused and a large quantity of heat may be consumed in evaporating a large amount of low-boiling-point starting reactants. As for the pressure within the reaction vessel, the distillation may be carried out at ordinary pressure or under reduced pressure. From the equipment viewpoint, however, it is preferably carried out at ordinary pressure.

The apparatus system used in the esterification reaction step is preferably used as the apparatus system in the above step of distilling off the solvent.

Referring to the above general formula (1), when $R^2$ is —$CH_2$—, —$(CH_2)_2$— or —$C(CH_3)_2$—, the general formula (1) represents an unsaturated alcohol-alkylene oxide adduct, namely a polyalkylene glycol monoalkenyl ether monomer, and is one of configurations of the polyalkylene glycol monomer as well. As the alcohol to be used in producing such a polyalkylene glycol monoalkenyl ether monomer, there may be mentioned allyl alcohol, methallyl alcohol, 3-buten-1-ol, 3-methyl-3-buten-1-ol, 3-methyl-2-buten-1-ol, 2-methyl-3-buten-2-ol and like unsaturated alcohols. These may be used singly or two or more of them may be used in combination.

The aqueous polyalkylene glycol monomer solution of the present invention, namely the aqueous polyalkylene glycol monomer solution stored and/or transferred in accordance with the present invention, can suitably be applied as a raw material for the production of various polymers. Such polymers can suitably be used as raw materials for the production of cement additives, for instance, and, in addition, they can also be used as such chemical products as pigment dispersants for dispersing calcium carbonate, carbon black, ink and the like, scaling inhibitors, dispersants for gypsum-water slurries, dispersants for coal-water slurries (CWM) and thickening agents.

In the following, a production method of polymers for cement dispersants using, as a raw material for the production thereof, the aqueous polyalkylene glycol monomer solution stored and/or transferred in accordance with the present invention, a production method of cement additives containing said polymers for cement dispersants and a method of using said cement additives are described.

As the above polymers for cement dispersants, there may be mentioned polycarboxylic acid type polymers obtainable by polymerizing a monomer composition comprising the polyalkylene glycol monomer and an unsaturated carboxylic acid monomer as essential components. The polymerization method of such polycarboxylic acid type polymer is not particularly restricted but any of those known polymerization methods such as solution polymerization or bulk polymerization, for instance, using a polymerization initiator may be employed.

The above unsaturated carboxylic acid monomer includes, for example, unsaturated monocarboxylic acids such as (meth)acrylic acid, crotonic acid, tiglic acid, citronellic acid, undecylenic acid, elaidic acid, erucic acid, sorbic acid, linolic acid and the like; unsaturated dicarboxylic acids such as maleic acid, fumaric acid, citraconic acid, mesaconic acid, itaconic acid and the like; and monoesters derived from these dicarboxylic acids and alcohols; as well as univalent metal salts, bivalent metal salts, ammonium salts and organic amine salts derived therefrom.

The polycarboxylic acid type polymers may also be copolymerized with a monomer(s) other than the unsaturated carboxylic acid monomers, if necessary. As such monomers, there may be mentioned unsaturated amides such as (meth)acrylic acid and (meth)acrylalkylamide; vinyl esters such as vinyl acetate and vinyl propionate; unsaturated sulfonic acids such as vinylsulfonic acid, (meth)allylsulfonic acid, sulfoethyl (meth)acrylate, 2-methylpropanesulfonic acid (meth), acrylamide and styrenesulfonic acid, and univalent metal salts, bivalent metal salts, ammonium salts and organic amine salts thereof; aromatic vinyls such as styrene and α-methylstyrene; and so forth.

The above polycarboxylic acid type polymers are preferably polymers having a weight average molecular weight within a specific range. For example, the weight average molecular weight on the polyethylene glycol equivalent basis as determined by gel permeation chromatography (hereinafter, "GPC") under the measuring conditions given below is preferably 500 to 500,000. If it is less than 500, the water reducing capacity of the cement additives may decrease. If it exceeds 500,000, the water reducing capacity and slump loss preventing effects of the cement additives may decrease. A range of 5,000 to 300,000 is more preferred and a range of 8,000 to 100,000 is still more preferred.

The above GPC is constituted of an eluent storage tank, eluent feeding apparatus, automated sampler, column oven, column, detector, data processing machine and so forth. The molecular weight can be determined, for example by combinedly using the following commercial devices and selecting the measuring conditions:

Molecular Weight Measuring Conditions
Model: LC Module 1 plus (trademark; product of Waters)
Detector: Differential refractometer (RI) 410 (trademark; product of Waters)
Eluent: A solution of 0.05 M sodium acetate in an acetonitrile/ion-exchange water (40/60) mixture as adjusted to pH 6 with acetic acid is used.
Eluent flow rate: 1.0 ml/min.
Columns:
TSK-GEL guard column (inside diameter 6 mm, length 40 mm)
+ TSK-GEL G-4000 SWXL (inside diameter 7.8 mm, length 300 mm)
+ TSK-GEL G-3000 SWXL (inside diameter 7.8 mm, length 300 mm)
+ TSK-GEL G-2000 SWXL (inside diameter 7.8 mm, length 300 mm) (all being trademarks; products of Tosoh Corp.)
Column oven temperature: 40° C.
Working curve: The working curve varies according to the number of standard samples and the molecular weights thereof, the method of baseline drawing and the method of obtaining an approximate expression for the working curve and the like. Therefore, the following conditions are preferably established.

1. Standard Samples

Commercially available standard polyethylene oxide (PEO) and standard polyethylene glycol (PEG) are used as the standard samples. Preferably, the species having the following molecular weights are used as the. standard samples: 1470, 4250, 7100, 12600, 24000, 46000, 85000, 219300, 272500 (9 points in total).

In selecting these standard samples, the following were taken into consideration:
(1) at least 7 standard samples having a molecular weight not less than 900 are included;
(2) at least one standard sample having a molecular weight between 900 and 2,000 is included;
(3) at least 3 standard samples having a molecular weight between 2,000 and 60,000 are included;
(4) at least one standard sample having a molecular weight of 200,000±30,000 is included; and
(5) at least one standard sample having a molecular weight of 270,000±30,000 is included.

2. Method of Baseline Drawing

Upper limit to molecular weight: A point where a peak appears from a horizontal and stable baseline.
Lower limit to molecular weight: A point where the main peak detection is finished.

3. Approximate Expression of the Working Curve

Based on the working curve ("elution time" versus "logarithm of molecular weight") constructed by using the above standard samples, a cubic approximate expression is derived and this is used in calculations.

The cement dispersants comprising the above-mentioned polycarboxylic acid type polymer can show good cement dispersing and slump maintaining capacities. If necessary, however, any of known cement additives (cement dispersants) other than the polycarboxylic acid type polymer may further be incorporated therein.

In the above cement dispersants, there may also be incorporated air entraining agents, cement wetting agents, expanding agents, water-proofing agents, retarders, quick setting agents, water-soluble high-molecular substances, thickening agents, flocculants, drying shrinkage reducing agents, reinforcing agents, accelerators, antifoaming agents and so forth.

The thus-obtained cement dispersants are used in cement compositions comprising cement and water, for example in hydraulic cements such as portland cement, high belite content cement, alumina cement or any of various cement blends, and in other hydraulic materials than cements such as gypsum.

The above cement dispersants produce excellent effects even at lower addition levels into hydraulic materials as compared with the conventional cement dispersants. In adding to mortar or concrete in which hydraulic cement is used, for instance, they may be added, in the step of blending, in an amount of 0.001 to 5% by weight relative to 100% by weight of cement. At a level lower than 0.001% by weight, effects of the cement dispersant may not be fully produced. If the level exceeds 5% by weight, no more substantial increase in effect will be obtained, which may be disadvantageous in an economical viewpoint. A level of 0.01 to 1% by weight is more preferred. Thereby, various effects can be produced, for example attainment of high water reducing percentage, improvements in slump loss preventing ability, reductions in water content per unit volume of concrete, increases in strength and improvements in durability.

The method of storing and/or transferring polyalkylene glycol monomers according to the present invention, which has the constitution mentioned above, can satisfactorily prevent the occurrence of gel-like matter formation and decomposition reactions and thereby can satisfactorily prevent the occurrence of troubles in the production process and the deteriorations in performance characteristics or quality of various chemical products. The polymers produced from polyalkylene glycol monomers stored and/or transferred according to the invention can be used as raw materials for producing such chemical products as cement additives, pigment dispersants for dispersing calcium carbonate, carbon black and ink and the like, scaling inhibitors, dispersants for gypsum-water slurries, dispersants for coal-water slurries (CWM) and thickeners.

BEST MODE FOR CARRYING OUT THE INVENTION

The following examples illustrate the present invention in further detail. These examples are, however, by no means limitative of the scope of the present invention. Unless otherwise specified, "part(s)" means "part(s) by weight" and "%" means "% by weight".

PRODUCTION EXAMPLE 1

An autoclave equipped with a thermometer, pressure gauge and stirrer was charged with 1,870 parts of 3-methyl-3-buten-1-ol (unsaturated alcohol) and 6 parts of flaky sodium hydroxide, and sufficient nitrogen substitution was attained by repeating the procedure comprising pressurization with nitrogen and discharging the same. The temperature of this mixture was raised to 120° C., the initial pressure was set at 0.09 MPa, and 9,560 parts of ethylene oxide was added over 15 hours, during which the reaction temperature was maintained at 120±5° C. and the reaction pressure at a level not higher than 0.78 MPa. The reaction temperature was further maintained for 1 hour to thereby drive the addition reaction of ethylene oxide with methanol to completion, whereby a 3-methyl-3-buten-1-ol poly(n=10)

ethylene glycol adduct [CH$_2$=C(CH$_3$)CH$_2$CH$_2$O(CH$_2$CH$_2$O)$_{10}$H] resulting from addition of 10 moles of ethylene oxide to each mole of 3-methyl-3-buten-1-ol was obtained. The thus-obtained polyalkylene glycol monomer (1) had a freezing point of 17° C.

Production Example 2

An autoclave equipped with a thermometer, pressure gauge and stirrer was charged with 1,145 parts of the polyalkylene glycol monomer (1) and 4 parts of a 50% aqueous solution of sodium hydroxide and, after dehydration by depressurization and heating, nitrogen substitution was effected by pressurization with nitrogen. The temperature was set to 120° C., the pressure was set at 0.16 MPa, and 3,825 parts of ethylene oxide was added over 12 hours, during which the reaction temperature was maintained at 120±5° C. and the reaction pressure at a level not higher than 0.78 MPa. The reaction temperature was further maintained for 1 hour, whereby a 3-methyl-3-buten-1-ol poly(n=50) ethylene glycol adduct [CH$_2$=C(CH$_3$)CH$_2$CH$_2$O(CH$_2$CH$_2$O)$_{50}$H] resulting from addition of 50 moles of ethylene oxide to each mole of 3-methyl-3-buten-1-ol was obtained. The thus-obtained polyalkylene glycol monomer (2) had a freezing point of 52° C., a hydroxyl value of 25.1 mg-KOH/g, a PEG content of 6.1% and an isoprene content of 960 ppm.

The polyalkylene glycol monomer (2) obtained was cooled to a temperature not higher than 80° C. and, then, 1,240 parts of water was added to give a 80% aqueous solution of the polyalkylene glycol monomer (2) This aqueous solution had a viscosity of 2.8×10$^{-1}$ Pa·s at 30° C., 1.76×10$^{-1}$ Pa·s at 40° C., and 1.28×10$^{-1}$ Pa·s at 50° C.

Method of Hydroxyl Value Determination (1) Phthalic anhydride (35 g) was dissolved in 200 ml of pyridine (special reagent grade) and the thus-prepared phthalating reagent was stored in a light resistant bottle. (2) About 2.4 g of the sample was weighed in a Teflon-stoppered flask and accurately weighed to a precision of 0.1 mg. (3) The phthalating reagent (9 ml) was added using a dispenser. The phthalating reagent in the dispenser was sufficiently purged prior to use so that the measurement error could be reduced. (4) In a blank procedure, three flasks containing no sample were prepared and 9 ml of the phthalating reagent was added to each flask using the dispenser. (5) The flask was stoppered and heated on a hot plate (trademark: "HGT-180"; product of Toshiba) adjusted to a surface temperature of 120±5° C. to allow the esterification reaction to proceed. The reaction time was 30 minutes. The blank flasks were not heated. (6) During heating, the reaction solution was stirred once or twice while taking care not to scatter the same. (7) After cooling to room temperature, about 50 ml of pure water was added. (8) The flask was equipped with an automatic titrator (trademark: "COMTITE-500"; product of Hiranuma Sangyo) and titration was carried out with 0.5 N potassium hydroxide. The 0.5 N potassium hydroxide in the buret was thoroughly purged prior to use to remove bubbles. (9) Two or three measurements were carried out for each sample and the average value was calculated. (10) In case the sample was alkaline or acidic, the hydroxyl value of the sample was determined by correcting the hydroxyl value obtained according to the formula given below. (11) Where necessary, the average molecular weight and the number of moles of ethylene (ethylene oxide) added were calculated based on the hydroxyl value obtained.

Hydroxyl value=(B−A)×0.5×56.11/G−AC+AG

B: Amount (ml) of the titrant in the blank test
A: Amount (ml) of the titrant for the sample
F: 0.5 N, concentration of the potassium hydroxide solution
G: Weight (g) of the sample taken
AC: Alkali value (mg-KOH/g) of the sample
AV: Acid value (mg-KOH/g) of the sample The PEG content was determined by high performance liquid chromatography under the following conditions:

PEG Content Measuring Conditions
Liquid feeding apparatus: Hitachi model L-6000 (trademark)
Automatic sampler: Hitachi model L-7200 (trademark)
Analyzer: Shimadzu model LC-10 (trademark)
RI detector: GL Science model 504R (trademark)
Column used: Shodex model GF-310 (trademark) (300 mm in length), one column
Column temperature: 40° C.
Eluent: pure water
Flow rate: 1.5 ml/min
Injection size: 20 µl The isoprene content was determined by GC-MS under the following conditions.

Isoprene Content Measuring Conditions
GC-MS: Shimadzu model GC-17A and QP-5000 (trademarks)
Head space: Perkin-Elmer model HS-40 (trademark)
Column: J&W model DB-1 (trademark) (0.32 mm in inside diameter×60 m in length×1 µl in membrane thickness)
Mobile phase: helium gas
Flow rate: 130 kPa (head space inlet regulator)
Column temperature programming: 5° C./min from 80 to 250° C., followed by 10 minutes of maintenance at 250° C.
Injection temperature: 250° C.
HS sample heating conditions: 130° C.×10 minutes
HS needle temperature: 170° C.
HS trans temperature: 170° C.
GC-MS interface temperature: 250° C.

EXAMPLE 1

An 80% aqueous solution of the polyalkylene glycol monomer (2) obtained in Production Example 2 was stored in a drier maintained at 60° C. in an air atmosphere and the change in PEG content in the aqueous solution with time was followed. The results are shown in Table 2. Even at the temperature of 60° C., the PEG content possibly resulting from decomposition of the polyalkylene glycol monomer (2) did not increase and it was thus found that the monomer could be stored stably.

EXAMPLE 2

An 80% aqueous solution of the polyalkylene glycol monomer (2) obtained in Production Example 2 was bubbled with nitrogen for 1 minute and stored in a nitrogen atmosphere at 60° C. and the change in PEG content in the aqueous solution with time was followed. The results are shown in Table 2. Even at the temperature of 60° C., the PEG content possibly resulting from decomposition of the polyalkylene glycol monomer (2) did not increase and it was thus found that the monomer could be stored stably.

COMPARATIVE EXAMPLE 1

The polyalkylene glycol monomer (2) obtained in Production Example 2 was placed in a container made of SUS 316 and the container was closed and allowed to stand at room temperature. The contents soon coagulated. After 2 months, the container was heated with steam at 120° C. to thereby melt the contents. After 17 hours, the contents were completely melted. After melting, a sample was withdrawn from the container and analyzed. The thus-obtained polyalkylene glycol monomer (2) showed an increased hydroxyl value of 26.5 mg KOH/g, an increased PEG content of 10.9% and an increased isoprene content of 2,330 ppm. Different from the polyalkylene glycol monomers (2) in Examples 1 and 2, which were stored stably, this monomer could not be used as a raw material for cement additives, hence was discarded. The time course of change in PEG content in the aqueous solution is shown in Table 2.

TABLE 2

| | Change in PEG content (weight %) in the aqueous solution | | | |
|---|---|---|---|---|
| | When charged | 1 month later | 2 months later | 4 months later |
| Example 1 | 6.2 | 6.6 | 6.7 | 6.4 |
| Example 2 | 6.4 | 6.0 | 6.0 | — |
| Compar. Ex. 1 | 6.1 | — | 10.9 | — |

PRODUCTION EXAMPLE 3

An autoclave equipped with a thermometer, pressure gauge and stirrer was charged with 4 parts of flaky sodium hydroxide and sufficient nitrogen substitution was performed by repeating the procedure comprising pressurization with nitrogen and discharging the same. Then, 575 parts of methanol was added, and the temperature of the mixture was raised to 90° C. The initial pressure was set at 0.15 MPa, and 7,900 parts of ethylene oxide was added over 8 hours, during which the reaction temperature was maintained at 125±5° C. and the reaction pressure at a level not higher than 0.78 MPa. Further, the reaction temperature was maintained for 2 hours to drive the addition reaction of ethylene oxide with methanol to completion, whereby methoxypoly(n=10) ethylene glycol [$CH_3O(CH_2CH_2O)_{10}H$] resulting from addition of 10 moles of ethylene oxide to each mole of methanol was obtained. The thus-obtained alkoxypolyalkylene glycol (3) had a freezing point of 10° C.

PRODUCTION EXAMPLE 4

An autoclave equipped with a thermometer, pressure gauge and stirrer was charged with 751 parts of the alkoxypolyalkylene glycol (3) and sufficient nitrogen substitution was performed by repeating the procedure comprising pressurization with nitrogen and discharging the same. The temperature was set to 153° C., the pressure was set at 0.15 MPa, and 1,050 parts of ethylene oxide was added over 6 hours, during which the reaction temperature was maintained at 153±5° C. and the reaction pressure at a level not higher than 0.78 MPa. The reaction temperature was further maintained for 1 hour to drive the addition reaction of ethylene oxide with methanol to completion, whereby methoxypoly (n=25) ethylene glycol [$(CH_3O(CH_2CH_2O)_{25}H$] resulting from addition of 25 moles of ethylene oxide to each mole of methanol was obtained. The thus-obtained alkoxypolyalkylene glycol (4) had a freezing point of 40° C.

PRODUCTION EXAMPLE 5

An autoclave equipped with a thermometer, pressure gauge and stirrer was charged with 1,800 parts of the alkoxypolyalkylene glycol (4) and 7.7 parts of a 50% aqueous solution of sodium hydroxide and, after dehydration by depressurization and heating, nitrogen substitution was performed by pressurizing with nitrogen. The temperature was set to 153° C., the pressure was set at 0.15 MPa, and 6,647 parts of ethylene oxide was added over 5 hours, during which the reaction temperature was maintained at 53±5° C. and the reaction pressure at a level not higher than 0.78 MPa. The reaction temperature was further maintained for 1 hour to drive the addition reaction of ethylene oxide with methanol to completion, whereby methoxypoly(n=120)ethylene glycol [$CH_3O(CH_2CH_2O)_{120}H$] resulting from addition of 120 moles of ethylene oxide to each mole of methanol was obtained. The thus-obtained alkoxypolyalkylene glycol (5) had a freezing point of 55° C.

The alkoxypolyalkylene glycol (5) had a hydroxyl value of 11.2 mg-KOH/g, a viscosity of $6.0 \times 10^{-1}$ Pa·s at 74° C., $3.02 \times 10^{-1}$ Pa·s at 89° C. and $1.64 \times 10{-1}$ Pa·s at 124° C., and a pour point (freezing point) of 55° C. A Haake high-temperature viscometer PK 100 (trademark) was used for viscosity measurements.

Esterification

A glass-made reaction vessel equipped with a thermometer, stirrer, byproduct water separator and reflux condenser was charged with 7,420 parts of the above alkoxypolyalkylene glycol (5), 605 parts of methacrylic acid, 401 parts of cyclohexane as dehydrating solvent, 177 parts of paratoluenesulfonic acid monohydrate as acid catalyst and 2 parts of phenothiazine as polymerization inhibitor and the esterification reaction was started by raising the temperature to 115° C. while stirring the mixture solution. After 40 hours, the esterification conversion was confirmed to have reached at least 98%, the mixture was cooled to not higher than 60° C., and 132 parts of a 30% aqueous solution of sodium hydroxide and 1,702 parts of water were added. Then, the temperature was again raised and the cyclohexane was distilled off azeotropically with water to give an 80% aqueous polyalkylene glycol monomer mixture solution (Ratio 80). During the above esterification reaction, no gel-like matter was formed.

A 70% aqueous polyalkylene glycol monomer mixture solution (Ratio 70) and a 40% aqueous polyalkylene glycol monomer mixture solution (Ratio 40) were obtained by adjusting the concentration of the 80% aqueous polyalkylene glycol monomer mixture solution (Ratio 80) by adding water. These aqueous polyalkylene glycol monomer mixture solutions were measured for pour point (° C.) and viscosities (Pa·s) at 40° C., 50° C., 60° C. and 70° C. The measurement results are shown in Table 3.

TABLE 3

| | | Monomer concentration in aqueous monomer mixture solution | | |
|---|---|---|---|---|
| | | (Ratio 80) 80 wt. % | (Ratio 70) 70 wt. % | (Ratio 40) 40 wt. % |
| Pour point (° C.) | | 26 | 15 | 3 |
| Viscosity of | 40° C. | 520 | 294 | 36 |

TABLE 3-continued

|  |  | Monomer concentration in aqueous monomer mixture solution | | |
|---|---|---|---|---|
|  |  | (Ratio 80) 80 wt. % | (Ratio 70) 70 wt. % | (Ratio 40) 40 wt. % |
| aqueous monomer mixture solution (mPa·s) | 50° C. | 348 | 202 | 29 |
|  | 60° C. | 257 | 148 | 25 |
|  | 70° C. | 190 | 114 | 21 |

COMPARATIVE EXAMPLE 2

In a laboratory at room temperature (20° C.), the 80% aqueous polyalkylene glycol monomer mixture solution (pour point 26° C.) partly solidified and the contents localized. For use in polymerization, the fraction that had solidified was melted to give a uniform solution by heating in a drier at 90° C. for 3 hours. After melting, the aqueous polyalkylene glycol monomer mixture solution was diluted to 1% and filtered through a 45-μm filter, whereupon a resistance due to high molecular weight impurities was observed.

EXAMPLE 3

The 40% aqueous polyalkylene glycol monomer mixture solution (Ratio 40) and 70% aqueous polyalkylene glycol monomer mixture solution (Ratio 70) occurred as uniform solutions, hence were used as such. Each aqueous polyalkylene glycol monomer mixture solution was diluted to 1% and filtered through a 0.45-μm filter. In both cases, any resistance due to high molecular weight impurities resulting from heating was not observed.

EXAMPLE 4

To 8,000 parts of a commercial methoxypoly (n=23) ethylene glycol (mono)methacrylate species (trademark: "M-230G"; product of Shin Nakamura Kagaku) (pour point: 35° C.) were added 2,000 parts of water and 1 part of phenothiazine as polymerization inhibitor, and the mixture was thoroughly stirred to effect dissolution to give an aqueous solution (A) with a concentration of 80%. The aqueous solution (A) remained stable in a room (temperature: 20° C.) for at least 1 month without polymerization. After 1 month, a monomer mixture solution (A) was prepared by adding 200 parts of acrylic acid and 50 parts of water to 100 parts of the aqueous solution (A). On that occasion, the required amount could be weighed without any difficulty.

COMPARATIVE EXAMPLE 3

Acrylic acid (200 parts) and 250 parts of water were added to 800 parts of the above species M-230G in an attempt to obtain the same monomer mixture solution (A) as in Example 4. However, upon stirring until dissolution of M-230G, this mixture solution gelated with generation of heat. It is presumable that gelation occurred since the above M-230G was not stored in the form of an aqueous solution. The mixture solution that had gelated was discarded.

The invention claimed is:

1. A storing and/or transferring method of a polyalkylene glycol ether monomer
which comprises storing and/or transferring a polyalkylene glycol monomer in the form of an aqueous solution,
wherein POV of the polyalkylene glycol monomer is at a level not higher than 2,
and wherein said polyalkylene glycol ether monomer comprises a monomer represented by the following general formula (1):

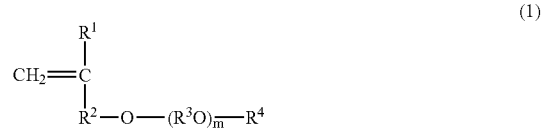

in the formula, $R^1$ and $R^4$ are the same or different and each represents a hydrogen atom or a hydrocarbon group containing 1 to 30 carbon atoms; $R^2$ represents —$CH_2$—, —$(CH_2)_2$— or —$C(CH_3)_2$—; $R^3O$ are the same or different and each represents an oxyalkylene group containing 2 to 18 carbon atoms; and m represents the average number of moles of the oxyalkylene group represented by $R^3O$ as added and is a number of 15 to 300.

2. The storing and/or transferring method of a polyalkylene glycol monomer according to claim 1,
wherein a concentration of water in said aqueous solution is not more than 90% by weight, with an amount of the aqueous solution being taken as 100% by weight.

3. The storing and/or transferring method of a polyalkylene glycol monomer according to claim 1,
wherein said polyalkylene glycol monomer is used as a raw material for a production of cement additives.

4. The storing and/or transferring method of a polyalkylene glycol monomer according to claim 2,
wherein said polyalkylene glycol monomer is used as a raw material for a production of cement additives.

5. The storing and/or transferring method of a polyalkylene glycol monomer according to claim 1,
wherein the temperature of the polyalkylene glycol monomer in the form of an aqueous solution is not lower than the pour point of said aqueous solution.

6. The storing and/or transferring method of a polyalkylene glycol ether monomer according to claim 1,
wherein a storage vessel and a transfer vessel is capable of maintaining a tightly closed state during storage and/or transfer.

7. The storing and/or transferring method of a polyalkylene glycol ether monomer according to claim 1,
wherein the concentration of water in the aqueous solution is adjusted depending on number of oxyalkylene groups in the polyalkylene glycol ether monomer so that the solution may flow at 200° C.

8. The storing and/or transferring method of a polyalkylene glycol ether monomer according to claim 1,
wherein the polyalkylene glycol ether monomer is stored and/or transferred in a vessel constructed by at least one material selected from the group consisting of stainless steel species, aluminum and iron.

* * * * *

UNITED STATES PATENT AND TRADEMARK OFFICE
CERTIFICATE OF CORRECTION

| | |
|---|---|
| PATENT NO. | : 7,030,282 B2 |
| APPLICATION NO. | : 10/001982 |
| DATED | : April 18, 2006 |
| INVENTOR(S) | : Koichiro Nagare |

It is certified that error appears in the above-identified patent and that said Letters Patent is hereby corrected as shown below:

In column 22, lines 52-56 should read,

7. The storing and/or transferring method of a polyalkylene glycol ether monomer according to claim 1, wherein the concentration of water in the aqueous solution is adjusted depending on number of oxyalkylene groups in the polyalkylene glycol ether monomer so that the solution may flow at ~~200°C~~ 20°C.

Signed and Sealed this

Fifteenth Day of August, 2006

JON W. DUDAS
*Director of the United States Patent and Trademark Office*